United States Patent
Moeykens

(10) Patent No.: US 12,315,377 B2
(45) Date of Patent: *May 27, 2025

(54) SYSTEMS AND METHODS FOR OPTIMIZING A CONTROLLED FLIGHT PLAN

(71) Applicant: BETA AIR LLC, South Burlington, VT (US)

(72) Inventor: Vincent Moeykens, Williston, VT (US)

(73) Assignee: BETA AIR LLC, South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,348

(22) Filed: Feb. 1, 2023

(65) Prior Publication Data
US 2023/0169874 A1    Jun. 1, 2023

Related U.S. Application Data

(63) Continuation of application No. 17/406,503, filed on Aug. 19, 2021, now Pat. No. 11,594,138.

(51) Int. Cl.
*G08G 5/32* (2025.01)
*G06N 20/00* (2019.01)
(Continued)

(52) U.S. Cl.
CPC .............. *G08G 5/32* (2025.01); *G06N 20/00* (2019.01); *G06T 19/006* (2013.01); *G08G 5/26* (2025.01);
(Continued)

(58) Field of Classification Search
CPC .................................................. G08G 5/0034
See application file for complete search history.

(56) References Cited

U.S. PATENT DOCUMENTS 9,262,929 B1 *  2/2016  Roy .................... G08G 5/55
9,754,496 B2    9/2017  Chan et al.
(Continued)

FOREIGN PATENT DOCUMENTS

DE    102019001240         2/2021
EP        3251108 A1 * 12/2017 ........... B64C 39/024
(Continued)

OTHER PUBLICATIONS

NPL, Harmon, Fred. G., The control of a parallel hybrid-electric propulsion system for a small unmanned aerial vehicle using a CMAC neural network, Elsevier, Science Direct, Neural Networks 18, Department of Mechanical and Aeronautical Engineering, University of California—Davis, Davis, CA 95616, USA (Year: 2005).*

(Continued)

*Primary Examiner* — Jean Paul Cass
(74) *Attorney, Agent, or Firm* — Brake Hughes Bellermann LLP

(57) ABSTRACT

A system or optimizing a flight plan for an electric aircraft is provided. The system includes, a computing device, wherein the computing device is configured to receive a plurality of measured flight data from a remote device, identify at least an aircraft requirement as a function of the plurality of measured flight data, generate at least a desired flight plan as a function of at least a plurality of measured flight data and the at least an aircraft requirement, and determine an optimized flight plan as a function of the at least a desired flight plan.

18 Claims, 8 Drawing Sheets

(51) Int. Cl.
  *G06T 19/00* (2011.01)
  *G08G 5/26* (2025.01)
  *G08G 5/55* (2025.01)
  *G08G 5/57* (2025.01)
  *G08G 5/59* (2025.01)

(52) U.S. Cl.
  CPC ............... *G08G 5/55* (2025.01); *G08G 5/57* (2025.01); *G08G 5/59* (2025.01)

(56) References Cited

U.S. PATENT DOCUMENTS

| | | | |
|---|---|---|---|
| 9,764,822 | B2 | 9/2017 | Morrison |
| 10,017,265 | B1* | 7/2018 | Larsen .................. B64D 27/24 |
| 10,332,405 | B2 | 6/2019 | Kopardekar |
| 10,497,267 | B2 | 12/2019 | Bosworth |
| 10,514,711 | B2 | 12/2019 | Bar-Nahum et al. |
| 10,720,066 | B2 | 7/2020 | Priest |
| 10,860,115 | B1* | 12/2020 | Tran ...................... G06F 3/0346 |
| 11,050,481 | B2 | 6/2021 | Crans et al. |
| 11,208,200 | B1* | 12/2021 | Auerbach ........... B64C 13/0421 |
| 11,353,890 | B1* | 6/2022 | Auerbach ............. B64D 27/24 |
| 11,544,984 | B2* | 1/2023 | Trivelpiece ............ G07C 9/253 |
| 11,551,559 | B2* | 1/2023 | Kuhara .................... G08G 5/26 |
| 11,585,949 | B2* | 2/2023 | Makineni ................. G08G 5/57 |
| 11,594,138 | B1* | 2/2023 | Moeykens ............... G08G 5/55 |
| 11,645,923 | B2* | 5/2023 | Mahkonen ............... G08G 5/57 |
| | | | 701/3 |
| 2016/0236790 | A1 | 8/2016 | Knapp et al. |
| 2016/0253907 | A1* | 9/2016 | Taveira .................... G08G 5/57 |
| | | | 701/3 |
| 2018/0151080 | A1 | 5/2018 | Mozer |
| 2018/0364713 | A1 | 12/2018 | Foster et al. |
| 2019/0033861 | A1 | 1/2019 | Groden et al. |
| 2019/0295033 | A1* | 9/2019 | Longin .................. B64C 39/024 |
| 2020/0266903 | A1 | 8/2020 | De Rosa et al. |
| 2021/0065565 | A1 | 3/2021 | Dow et al. |
| 2021/0089055 | A1* | 3/2021 | Tran ......................... G08G 5/74 |
| 2021/0125507 | A1 | 4/2021 | Haider et al. |
| 2021/0183257 | A1 | 6/2021 | Moon |
| 2021/0309383 | A1* | 10/2021 | Clark ..................... B64D 27/24 |
| 2021/0335137 | A1* | 10/2021 | Candido ................. G01W 1/10 |
| 2021/0350046 | A1* | 11/2021 | Bosson .................. G06Q 50/40 |
| 2021/0407303 | A1* | 12/2021 | Yogesha ................. G08G 5/74 |
| 2022/0108235 | A1* | 4/2022 | Schulz ................. G06Q 10/025 |
| 2022/0108262 | A1* | 4/2022 | Cella ...................... G05B 17/02 |
| 2022/0203841 | A1* | 6/2022 | Prabhu .................... B60L 58/13 |
| 2022/0223056 | A1* | 7/2022 | Dupray ................... G08G 5/21 |
| 2022/0399936 | A1* | 12/2022 | Arksey .................. G06T 17/10 |

FOREIGN PATENT DOCUMENTS

| | | | |
|---|---|---|---|
| EP | 3399666 | A1 | 11/2018 |
| JP | 6037600 | B2 | 11/2016 |
| KR | 101920790 | B1 | 11/2018 |
| WO | 2018175349 | A1 | 9/2018 |
| WO | WO-2021133379 | A1 * | 7/2021 .......... G01S 13/933 |

OTHER PUBLICATIONS

Tolga Baklacioglu, Modeling the fuel flow-rate of transport aircraft during flight phases using genetic algorithm-optimized neural networks, vol. 49, science direct, aerospace science and technology (Year: 2016).*

Lascara et al., Urban Air Mobility Airspace Integration Concepts, Jun. 30, 2019.

* cited by examiner though, that the at least an aircraft requirement comment

SYSTEMS AND METHODS FOR OPTIMIZING A CONTROLLED FLIGHT PLAN

CROSS-REFERENCE TO RELATED APPLICATIONS

This application is a continuation of U.S. Nonprovisional application Ser. No. 17/406,503 filed on Aug. 19, 2021, and entitled "SYSTEMS AND METHODS FOR OPTIMIZING A CONTROLLED FLIGHT PLAN," which is incorporated by reference herein in its entirety.

FIELD OF THE INVENTION

The present invention generally relates to the field of optimizing flight plans for aircraft. In particular, the present invention is directed to systems and methods for optimizing a controlled flight plan.

BACKGROUND

Flight plans for aircraft are generally managed by an air traffic control service. An aircraft may have several different flight paths or highways to follow to reach a specific destination tailored to the type of aircraft and its cargo. Moreover, unlike navigation in ground transportation vehicles, an aircraft must consider another dimension such as altitude when determining a path or highway to follow. Determining a flight plan with an air traffic control service may become quite involved with multiple exchanges of information, especially when determining multiple flight plans optimized for flight of varying types of aircraft.

SUMMARY OF THE DISCLOSURE

In an aspect, a system for optimizing a flight plan for an electric aircraft is disclosed. The system includes a computing device, wherein the computing device is configured to receive a plurality of measured flight data, associated with an electric aircraft, from a remote device, wherein the plurality of measured flight data includes a departure datum, and wherein the departure datum includes information on a remaining battery life status of a battery of the electric aircraft. The computing device further configured to identify at least an aircraft requirement as a function of the plurality of measured flight data, the at least an aircraft requirement comprising an aircraft limit and an aircraft class. The computing device further configured to generate at least a desired flight plan as a function of at least the departure datum and the at least an aircraft requirement. The computing device further configured to generate an optimized flight plan as a function of the at least a desired flight plan, wherein generating the optimized flight plan includes determining a required energy of the at least a desired flight plan and generating the optimized flight plan as a function of the required energy.

In another aspect, a method for optimizing a flight plan for an electric aircraft is disclosed. The method includes receiving, at a computing device, a plurality of measured flight data, associated with an electric aircraft, from a remote device, wherein the plurality of measured flight data includes a departure datum, and wherein the departure datum includes information on a remaining battery life status of a battery of the electric aircraft. The method further includes identifying, at the computing device, at least an aircraft requirement as a function of the plurality of measured flight data, the at least an aircraft requirement comprising an aircraft class. The method further includes generating, at the computing device, at least a desired flight plan as a function of at least the departure datum and the at least an aircraft requirement; and generating, at the computing device, an optimized flight plan as a function of the at least a desired flight plan, wherein generating the optimized flight plan includes determining a required energy of the at least a desired flight plan and generating the optimized flight plan as a function of the required energy.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
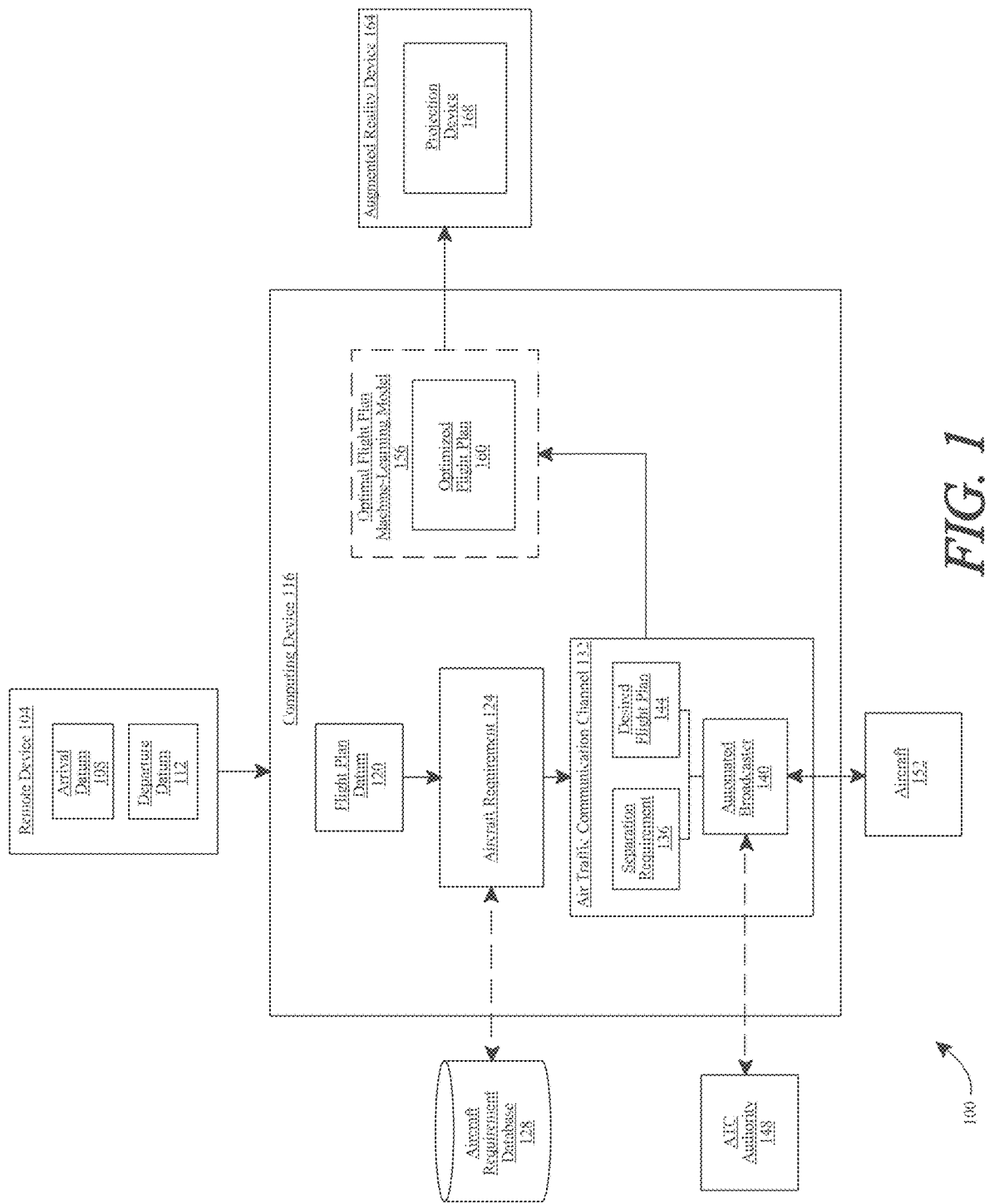
FIG. 1 is a block diagram of an exemplary embodiment of a system for optimizing traffic control flight plan.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for optimizing traffic control flight plan. In some embodiments, systems and methods for optimizing traffic control flight plan for an aircraft. In an embodiment, an aircraft may include an electric aircraft, wherein the aircraft is powered by an electric power source. In some further embodiments, the aircraft may include an electric vertical takeoff and landing (eVTOL) aircraft. Exemplary embodiments illustrating aspects of the present disclosure are described below in the context of several specific examples.

Aspects of the present disclosure can be used to equip an electric aircraft with a communication channel to efficiently communicate with air traffic control (ATC) service providers and other aircrafts in the event that the electric aircraft is too far from an ATC ground stations to exchange necessary operational information and facilitate any operational problems. Aspects of the present disclosure can also include a very high frequency (VHF) communication channel and an automatic dependent surveillance broadcast (ADS-B) surveillance to communicate with other aircrafts in the air and ATC service providers via satellite communication or datalink and/or ground communication.

Aspects of the present disclosure can advantageously allow for bypassing of the typical instrument approach utilized by aircraft which can involve timely processing through some type of central government regulatory and control system, and can desirably allow electric aircraft to directly communicate with a remote device, site or facility such as a relevant central or local ATC authority, another fleet management site, regarding the aircraft's flight approach plan.

Aspects of the present disclosure can allow for remote communication with other aircrafts in the air to identify a safe distance to maintain from the aircraft to avoid collision, communicate to the ATC authority new parameters for a flight plan, generate a set of highways of multiple layers of altitudes, and optimizing the set of highways to produce an optimized flight plan of multiple designated routes the electric aircraft may follow. The multiple designated routes may represent a route the electric aircraft may take if it was a different class of aircraft such as a drone, an unmanned aerial vehicle (UAV), a passenger aircraft, a delivery aircraft, and the like.

For purposes of this disclosure, in aviation, an "instrument approach", instrument approach plan or instrument approach procedure (IAP) is a series of predetermined maneuvers for the orderly transfer of an aircraft operating under instrument flight rules from the beginning of the initial approach to a landing or to a point from which a landing may be made visually. Instrument flight rules (IFR) is one of two sets of regulations governing all aspects of civil aviation aircraft operations; the other is visual flight rules (VFR). The U.S. Federal Aviation Administration's (FAA) Instrument Flying Handbook defines IFR as: "Rules and regulations established by the FAA to govern flight under conditions in which flight by outside visual reference is not safe. IFR flight depends upon flying by reference to instruments in the flight deck, and navigation is accomplished by reference to electronic signals." It is also a term used by pilots and controllers to indicate the type of flight plan an aircraft is flying, such as an IFR or VFR flight plan.

Aspects of the present disclosure can assist with and/or substitute for air traffic control (ATC) instrument approach for electric aircraft seeking to land at a recharging infrastructure. Typically, instrument flight plane pilots provide information such as type of aircraft, start and departure airport, end airport, current path they want to fly (low/high altitude airways), safety information (people on board, equipment and the like) which is filed through a central government system. Any central or local ATC receives a copy of the intended flight plan. When the pilot is ready to fly, he or she typically uses a radio and requests permission for the intended flight plan. In response, the pilot receives back either the original flight plan for execution or a modified one.

Now referring to FIG. 1, an exemplary embodiment 100 of a system for optimizing traffic control flight plan is illustrated. The system includes a remote device 104 that may further include a sensor configured to detect a plurality of measured flight data. A "measured flight data," for the purpose of this disclosure, is an element of data describing a plurality of parameters that May affect or be affected by a flight of an electric aircraft. the plurality of measured flight data may include an arrival datum 108 and a departure datum 112. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Sensor may include circuitry, computing devices, electronic components or a combination thereof that translates any datum into at least an electronic signal configured to be transmitted to another electronic component. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. An "arrival datum," for the purpose of this disclosure, is an element of data describing the landing and landing location of an electric aircraft. Arrival datum 108 may include information related to any infrastructure configured to support the docking and/or landing of an electric aircraft. the infrastructure may include a recharging pad, a docking terminal, an aircraft hangar, and the like thereof. Arrival datum 108 may include parameters identifying the performance of a plurality of flight components of an electric aircraft at the time of landing. A "departure datum," for the purpose of this disclosure, is an element of data describing the parameters of the initial flight and/or departure of an electric aircraft. Departure datum 112 may include a plurality of measured flight data of an aircraft from the startup of the electric aircraft to the cruising speed of the electric aircraft in flight. Departure datum 112 may include parameters regarding the performance and capabilities of an electric aircraft. Departure datum 112 may include, but not limited to, battery life cycle, remaining battery, health status of flight components, and the like thereof. A person of ordinary skill in the art, after viewing the entirety of this disclosure, would appreciate the multitude of quantitative parameters of an electric aircraft during the take-off and landing of an electric aircraft.

With continued reference to FIG. 1, a "remote device," for the purposes of this disclosure, is device used to capture electronic signals representing physical data regarding external factors. Remote device may include a computing device. Remote device 104 may include any remote device as described in the entirety of this disclosure. Remote device 104 may include an air traffic control (ATC) system which may include an ATC system command center, an air route traffic control center, a terminal radar approach control, an ATC tower, a flight service station, and the like thereof. Remote device may include an aircraft, a fleet manager, or a computing device associated with the ATC. in a non-limiting embodiment, an ATC system may provide the plurality of measured flight data to a computing device 116. The plurality of measured flight data may include an interference datum and a safety datum. The health remote device may be communicatively coupled to an electric aircraft which may include an eVTOL aircraft.

With continued reference to FIG. 1, remote device 104 may include a sensor communicatively connected to a computing device 116. Sensor may be communicatively connected to a remote device 104. A "sensor," for the purposes of this disclosure, is a computing device configured to detect, capture, measure, or combination thereof, a plurality of external and electric vehicle component quantities. Sensor may be integrated and/or connected to at least an actuator, a portion thereof, or any subcomponent thereof. Sensor may include circuitry or electronic components configured to digitize, transform, or otherwise manipulate electrical signals. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. The plurality of datum captured by sensor may include circuitry, computing devices, electronic components or a combination thereof that translates into at least an electronic signal configured to be transmitted to another electronic component.

With continued reference to FIG. 1, the remote device 104 may include a sensor which may further include a motion sensor. sensor 104 may include a motion sensor. A "motion sensor", for the purposes of this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 104 may include, but not limited to, torque sensor, gyroscope, accelerometer, magnetometer, inertial measurement unit (IMU), pressure sensor, force sensor, proximity sensor, displacement sensor, vibration sensor, LIDAR sensor, and the like. In a non-limiting embodiment sensor 104 ranges may include a technique for the measuring of distances or slant range from an observer including sensor to a target which may include a plurality of outside parameters. "Outside parameter," for the purposes of this disclosure, is environmental factors or physical electric vehicle factors including health status that may be further be captured by a sensor 104. Outside parameter may include, but not limited to air density, air speed, true airspeed, relative airspeed, temperature, humidity level, and weather conditions, among others. Outside parameter may include velocity and/or speed in a plurality of ranges and direction such as vertical speed, horizontal speed, changes in angle or rates of change in angles like pitch rate, roll rate, yaw rate, or a combination thereof, among others. Outside parameter may further include physical factors of the components of the electric aircraft itself including, but not limited to, remaining fuel or battery. Outside parameter may include at least an environmental parameter. Environmental parameter may be any environmentally based performance parameter as disclosed herein. Environment parameter may include, without limitation, time, pressure, temperature, air density, altitude, gravity, humidity level, airspeed, angle of attack, and debris, among others. Environmental parameters may be stored in any suitable datastore consistent with this disclosure. Environmental parameters may include latitude and longitude, as well as any other environmental condition that may affect the landing of an electric aircraft. Technique may include the use of active range finding methods which may include, but not limited to, light detection and ranging (LIDAR), radar, sonar, ultrasonic range finding, and the like. In a non-limiting embodiment, sensor may include at least a LIDAR system to measure ranges including variable distances from the sensor to a potential landing zone or flight path. LIDAR systems may include, but not limited to, a laser, at least a phased array, at least a microelectromechanical machine, at least a scanner and/or optic, a photodetector, a specialized GPS receiver, and the like. In a non-limiting embodiment, sensor including a LIDAR system may targe an object with a laser and measure the time for at least a reflected light to return to the LIDAR system. LIDAR may also be used to make digital 4-D representations of areas on the earth's surface and ocean bottom, due to differences in laser return times, and by varying laser wavelengths. In a non-limiting embodiment the LIDAR system may include a topographic LIDAR and a bathymetric LIDAR, wherein the topographic LIDAR that may use near-infrared laser to map a plot of a land or surface representing a potential landing zone or potential flight path while the bathymetric LIDAR may use water-penetrating green light to measure seafloor and various water level elevations within and/or surrounding the potential landing zone. In a non-limiting embodiment, electric aircraft may use at least a LIDAR system as a means of obstacle detection and avoidance to navigate safely through environments to reach a potential landing zone. Sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor.

With continued reference to FIG. 1, the remote device 104 may include a physical controller area network (CAN) bus unit that may use, without limitation, twisted pair, digital circuit elements/FGPA, microcontroller, or the like to perform, without limitation, processing and/or signal transmission processes and/or tasks. A "physical controller area network bus," as used in this disclosure, is vehicle bus unit including a central processing unit (CPU), a CAN controller, and a transceiver designed to allow devices to communicate with each other's applications without the need of a host computer which may be located physically at the aircraft and at least the remote device 104. Physical CAN bus unit may be consistent with disclosure of CAN bus unit in U.S. patent application Ser. No. 17/218,342 and titled "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated herein by reference in its entirety. In a non-limiting embodiment, a remote device may be used to communicated with the electric remote device as a function of a physical CAN bus unit. Remote device may include any suitable device or facility to which an aircraft's approach plan would be of interest for safety, planning and logistics purposes. For example, and without limitation, remote device 160 may be an air traffic control (ATC) device, such as an ATC computing device, that is operated by an air traffic control (ATC) site such as, without limitation, one located in an ATC tower or at an airport, and the like, among others. In another example, and without limitation, remote device may be another recharging site or platform or a fleet management facility, or a device such as a computing device at these locations.

With continued reference to FIG. 1, the remote device 104 that further includes a sensor configured to detect a plurality of measured flight data, wherein the plurality of measured flight data includes an interference datum and a safety datum. An "interference datum," for the purposes of this disclosure, is any datum includes an element of data representing potentially hazardous obstacles that may put an electric aircraft at risk. In a non-limiting embodiment, interference datum may include information regarding turbulent weather. For example and without limitation, interference datum may include a wind speed, a humidity percentage, a rate of rainfall, cloud cover, and the like. For example and without limitation, interference datum may include distances from other flying objects and/or surface infrastructures or objects. A "safety datum," for the purposes of this disclosure, is any datum including an element of data representing health information of aircraft flight components, aircraft cargo, aircraft personnel, and the like thereof. In a non-limiting embodiment, a safety datum may include information regarding the safety of an electric aircraft. For example and without limitation. In a non-limiting embodiment, safety datum may include information regarding the safety of human personal and/or cargo of an electric aircraft. For example and without limitation, safety datum may include a recommended set of aircraft commands dictating the speed, altitude, and path of an electric aircraft that an electric aircraft may follow to achieve the minimum standard of safety. A person of ordinary skill in the art, after viewing the entirety of this disclosure, would appreciate the level of safety parameters to be incorporated in the context of electric aircraft flight. A "flight component", for the purposes of this disclosure, includes components related to, and mechanically connected to an aircraft that manipulates a fluid medium in order to propel and maneuver the aircraft through the fluid medium.

With continued reference to FIG. 1, remote device 104 may be configured to detect an input datum. An "input datum," for the purposes of this disclosure, is at least an element of data identifying and/or a pilot input or command. At least pilot control may be communicatively connected to any other component presented in system, the communicative connection may include redundant connections configured to safeguard against single-point failure. Pilot input may indicate a pilot's desire to change the heading or trim of an electric aircraft. Pilot input may indicate a pilot's desire to change an aircraft's pitch, roll, yaw, or throttle. Pitch, roll, and yaw may be used to describe an aircraft's attitude and/or heading, as they correspond to three separate and distinct axes about which the aircraft may rotate with an applied moment, torque, and/or other force applied to at least a portion of an aircraft. Input datum may include mechanical movement of any throttle consistent with the entirety of this disclosure. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Sensor may include circuitry, computing devices, electronic components or a combination thereof that translates pilot input into at least an input datum configured to be transmitted to any other electronic component. Any pilot input as described herein may be consistent with any pilot input as described in U.S. patent application Ser. No. 17/218,387 filed on Mar. 51, 2021, and titled, "METHOD AND SYSTEM FOR FLY-BY-WIRE FLIGHT CONTROL CONFIGURED FOR USE IN ELECTRIC AIRCRAFT," which is incorporated herein in its entirety by reference. In a non-limiting embodiment, a remote device controlled by a remote pilot may use the remote device to transmit pilot input which may be detected and manipulated by the remote device 104 that may be used to control the electric aircraft and communicate with ATC authority and/or other aircrafts as a function of the computing device 116.

With continued reference to FIG. 1, system 100 includes a flight controller which may include a computing device 116 may be communicatively connected to the remote device 104 and configured to receive the plurality of measured flight data from the remote device 104. "Communicatively connected", for the purposes of this disclosure, is two or more components electrically, or otherwise connected and configured to transmit and receive signals from one another. Signals may include electrical, electromagnetic, visual, audio, radio waves, or another undisclosed signal type alone or in combination. Computing device 116 includes a computing device wherein the computing device is described in further detail in FIG. 4. Computing device 116 may be configured to generate a flight plan datum 120 as a function of the at least a plurality of measured flight data. A "flight plan datum," for the purposes of this disclosure, is any datum including an element of data representing information regarding the flight and the aircraft associated with the flight. The flight plan datum 120 further comprises a current path the electric aircraft intends to follow and a plurality of flight inputs. Flight inputs may include, but not limited to, aircraft model, departure location, endpoint location, safety data, and the like thereof. Flight plan datum 120 may further include aircraft altitudes, turns, rolls, velocities, accelerations, and the like thereof.

With continued reference to FIG. 1, computing device 116 may be configured to utilize a network methodology. Computing device 116 may further be configured to support digital communication in receiving and transmitting any datum or signals. Computing device 116 may include a physical CAN bus unit. A "digital communication," for the purposes of this disclosure, is a mode of transfer and reception of data over a communication channel via digital signals. Digital signals may include, but not limited to, audio signals, electrical signals, video signals, radar signals, radio signals, sonar signals, transmission signals, LIDAR signals and the like thereof. Digital communication may include, but not limited to, data transmission, data reception, a communication system, and the like. A communication system that may support digital communication may include a plurality of individual telecommunications networks, transmission systems, relay stations, tributary stations, and the like. In a non-limiting embodiment, the system 100 may transmit the plurality of measured data over a point-to-point or point-to-multipoint communication channels which may include, but not limited to, copper wires, optical fibers, wireless communication channels, storage media, computer buses and the like. The data being transmitted may be represented as, but not limited to, electromagnetic signals, electrical voltage, radio wave, microwave, infrared signals, and the like. In a non-limiting embodiment, transmission of data via digital communication may be conducted using any network methodology. A person of ordinary skill in the art, after viewing the entirety of this disclosure, would appreciate the transmission of data in the context of network methodologies and digital communication. A "transmission signal," as used in this disclosure, is a transmitted analogue and/or digital signal originated from physical CAN bus unit. Transmission signal may include the plurality of measured flight data, at least a desired flight plan, and the like thereof. Transmission signal may include radio frequency transmission signal. A "radio frequency transmission signal," as used in this disclosure, is an alternating electric current or voltage or of a magnetic, electric, or electromagnetic field or mechanical system in the frequency range from approximately 20 kHz to approximately 500 GHz. Radio frequency (RF) transmission signal May compose analogue and/or digital signal received, from instance via a network gateway and transmitted using functionality of output power of radio frequency from a transmitter to an antenna, and/or any RF receiver. A network gateway may be consistent with disclosure of any network gateway in U.S. patent application Ser. No. 17/218,342 and titled "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated herein by reference in its entirety. RF transmission signal may use longwave transmitter device for transmission of signals. RF transmission signal may include a variety of frequency ranges, wavelength ranges, ITU designations, and IEEE bands including HF, VHF, UHF, L, S, C, X, Ku, K, Ka, V, W, mm, among others. Radio frequency transmission signal may be generated by and/or from a network switch. Signals received by network switch from CAN gateway may be transmitted, for instance and without limitation as multiplexed by way of a multiplexor and/or selected by some logic at network switch, as a radio frequency transmission signal from network switch. Network switch may include a physical layer defining electrical and/or optical properties of a physical connection between a device, such as a CAN gateway, and a communication device such as without limitation a radiating antenna used to convert a time-varying electric current into an electromagnetic wave or field. In a non-limiting example, transmission signal of measured state data originating from physical CAN bus unit may be transmitted to a virtual CAN bus, and/or virtual CAN bus unit, as a radio wave-transmissible signal. Measured state data relating to a variety of flight information concerning an aircraft may be signaled to a virtual bus via a transmitting antenna and/or encoder and received by a receiving antenna and/or receiver at bus unit; transmission may be relayed by one or more intervening devices such as network hubs and/or nodes, satellites, or the like. Radio frequency signal transmission may be sent to a virtual bus unit and the virtual bus unit may correspondingly transmit back to physical CAN bus unit 104 through network switch.

With continued reference to FIG. 1, computing device 116 is configured to identify an aircraft requirement 124 as a function of the flight plan datum 120. An "aircraft requirement," for the purposes of this disclosure, is a plurality of information regarding the logistics and functionalities of an electric aircraft. In a non-limiting embodiment, the plurality of information may be used to uniquely identify the electric aircraft for the purposes of denoting an authorized flight plan for the electric aircraft. aircraft requirement 124 may include an aircraft class, an operator requirement, and an aircraft limit. An "aircraft class," for the purposes of this disclosure, is an identification denoting a category of aircraft the electric aircraft falls within. In a non-limiting embodiment, aircraft class may include one or more classes such as drones, passenger aircrafts, STOL aircrafts, delivery drones, VTOL aircrafts, eVTOL aircrafts, commercial airliners, cargo aircrafts, and the like thereof. Aircraft class may include, but not limited to, a unique identification number denoting type of aircraft. an "operator requirement," for the purposes of this disclosure, is an identification of the type of personnel/operator of the aircraft. the personnel/operator may include a pilot, an autopilot, and/or semi-autonomous pilot, wherein the operator requirement may include one or more of the mentioned personnel/operator. In a non-limiting embodiment, the operator requirement may denote a pilot wherein the aircraft requirement including the operator requirement may be transmitted to an air ATC authority so that the ATC authority may be informed that it is communicating with a physical pilot. An "aircraft limit," for the purposes of this disclosure, is an element of data representing the maximum capacity and/or capabilities of the electric aircraft. aircraft limit may include parameters of an aircraft's altitude limit, flight range, flight time limit, cargo capacity, and the like thereof. In some instances, aircraft limit may include parameters of an aircraft's battery life, energy output, energy density, or the like. As a non-limiting example, aircraft limit may be utilized to generate an energy output, energy density, or the like, for a desired flight plan. In some instances, desired flight plan may require a minimum energy density to complete. In some instances, desired flight plan may include flight phases. As used in this disclosure, "flight phases" are segments of a desired flight plan. In some instances, flight phases may be identified as a function of required energy usage and/or energy density needed to maintain the flight phase. As a non-limiting example, flight phases may be identified as low-power phases. Low-power phases may require a relatively low amount of energy to perform (e.g., cruising). Flight phases may be identified as higher-power phases. Higher-power phases may require a relatively high amount of energy to perform (e.g., takeoff, ascending, descending, landing). In a non-limiting embodiment, aircraft limit may include an altitude limit of a drone to be 400 feet above the surface wherein the altitude limit of an eVTOL aircraft may be 1,500 feet above the surface. Computing device 116 may be configured to identify the aircraft requirement 124 as a function of an aircraft requirement database 140 which may store/receive the aircraft class, the operator requirement, and the aircraft limit. In a non-limiting embodiment, the computing device 116 may retrieve data from the aircraft requirement database 140 to efficiently identify the aircraft requirement 124 and its specific components such as aircraft class, operator requirement, and aircraft limit, without the use of a remote device 104. A person of ordinary skill in the art, after viewing the entirety of this disclosure, would appreciate the use of the aircraft requirement database in identifying aircraft information.

With continued reference to FIG. 1, computing device 116 includes an air traffic communication channel 132. An "air traffic communication channel," for the purposes of this disclosure, is a physical transmission medium for telecommunications and/or computer networking. Air traffic communication channel 132 may be configured to convey signals between the electric aircraft and an ATC authority. Air traffic communication channel 132 may be configured to convey signals between the electric aircraft and other aircrafts in the air. Air traffic communication channel 132 may include a very high frequency (VHF) communication channel. Air traffic communication channel may include an automated broadcaster 140. An "automated broadcaster," for the purposes of this disclosure, is a surveillance technology used to communicate aircraft position information to separate entity such as an ATC authority or another aircraft in flight. Automated broadcaster 140 may include an inter-pilot air-to-air communication channel. Automated broadcaster 140 may include a datalink system configured to communicate data between a ground station and the electric aircraft. automated broadcaster 140 may include a satellite communication (SATCOM) receiver configured to transmit signals via a satellite. Automated broadcaster 140 may include an automatic dependent surveillance broadcast.

With continued reference to FIG. 1, the computing device 116 is configured to identify a separation requirement 136 as a function of the interference datum and the air traffic communication channel 132. A "Separation requirement," for the purposes of this disclosure, is an element of data representing a physical value of a distance an electric aircraft should maintain from a particular location. For example and without limitation, a separation requirement may include a distance of 1000 meters or 700 feet to be maintained from another aircraft. In a non-limiting embodiment, separation requirement 136 may be determined by compromising and/or concluding a distance to be maintained by digital communication between two aircraft operators. In a non-limiting embodiment, a particular location may include, but not limited to, a surface of the ground, a destination and/or arrival location, environmental obstacles, and the like. For example and without limitation, separation requirement may include a distance of 1000 meters or 700 feet to be maintained from the surface. The separation requirement 136 may include a distance threshold the electric aircraft must maintain to avoid at least a collision with another aircraft, obstacle, the surface, and the like. The separation requirement 136 may include a safety parameter that may be a function of the safety datum. In a non-limiting embodiment, the electric aircraft may communicate via the air traffic communication channel 132 with another aircraft to determine a safe distance to maintain with each other to avoid collision. Transmission signals may be sent and received through the automated broadcaster 140 serving as a hub or medium for the communication of signals.

With continued reference to FIG. 1, the computing device 116 is configured to receive at least a desired flight plan 144 as a function of the aircraft requirement 124 and the separation requirement 136. In a non-limiting embodiment, the air traffic communication channel 132 may communicate with an ATC authority 148 flight plan parameters including the separation requirement 136 and the aircraft requirement to determine the at least a desired flight plan 144 to be received by the air traffic communication 144. ATC authority may include any ATC system or ATC as described in the entirety of this disclosure. Communication may be conducted via digital communication. The at least a desired flight plan may represent at least a desired flight plan of an electric aircraft. The at least a desired flight plan 144 may include a flight plan that is confirmed and/or verified by the ATC authority 148 that satisfies the aircraft requirement 124 and the separation requirement 136. A person of ordinary skill in the art, after viewing the entirety of this disclosure, would appreciate the levels of communication between an electric aircraft and an ATC authority to manage a safe flight.

With continued reference to FIG. 1, computing device 116 may instruct the ATC communication channel 132 to transmit a proposed flight plan for approval. In a non-limiting embodiment, the proposed flight plan may be manually filed by a human pilot. In a non-limiting embodiment, the proposed flight plan may be generated as a function of the aircraft requirement 124. In a non-limiting embodiment, the proposed flight plan may be selected from a database 128 associated with the classification of the electric aircraft. For example and without limitation, the proposed flight plan may include aircraft name, aircraft flight number, aircraft type, aircraft intended speed and cruising altitude, aircraft route, and the like thereof. In a non-limiting embodiment, the ATC communication channel 132 may be configured to be activated by a human pilot manually and/or by a computing device 116 automatically to receive any incoming signals and broadcast an amplified, encoded signal back to an ATC authority 148. For example and without limitation, the automated broadcaster may include an on and off switch that may be triggered to activate the receiving and transmission of signals. In a non-limiting embodiment, an ATC authority 148 may analyze the proposed flight plan and transmit at least a desired flight plan 144 representing a confirmation and/or modification of the proposed flight plan. In a non-limiting embodiment, the ATC communication channel 132 may communicate via radio frequency with another aircraft in the sky 152 to determine a separation requirement 136. For example and without limitation, the communication between the electric aircraft and the other aircraft 152 may lead to a compromise and an adjusted proposed flight plan for approval by an ATC authority 148 as a function of a new separation element 136 that was determined by the communication. In a non-limiting embodiment, a separation requirement 136 may be determined by an ATC authority 148 instead of as result of communicating with another aircraft 152. In a non-limiting embodiment, the electric aircraft may not need to file a proposed flight plan to an ATC authority in which that becomes the at least a desired flight plan 144 to be optimized and/or optimized concurrently throughout a flight. For example and without limitation, a pilot of an electric aircraft which is not required by the Federal Aviation Administration to file a proposed flight plan may fly accordingly to a flight plan designated by the pilot or computing device 116. In a non-limiting embodiment, the computing device 116 may select a flight plan for approval from an aircraft requirement database 128. In a non-limiting embodiment, the computing device 116 may further store every new flight plan and/or plurality of flight plan datum 120 into the aircraft requirement database 128.

With continued reference to FIG. 1, in a non-limiting embodiment, computing device 116 may store a desired flight plan 144 that is approved by the Federal Aviation Administration and/or ATC authority 148 into the aircraft requirement database 128. For example and without limitation, the computing device 116 may recognize a planned flight's arrival and departure information as a function of the flight plan datum 120 and/or arrival datum 108 and departure datum 112 from the plurality of measured flight data, and select a flight plan that was already approved by the Federal Aviation Administration and/or ATC authority 148 to be followed by the electric aircraft. For example and without limitation, pulling an already approved flight plan may reduce the overall time and amount of communication between the electric aircraft and an ATC authority 148. In a non-limiting embodiment, computing device 116 may select a proposed flight plan from the aircraft requirement database 128 that may best correlate with the flight information for a flight assigned to the electric aircraft, in which that proposed flight plan is further configured to be filed to an ATC authority 148 and/or Federal Aviation Administration for approval.

With continued reference to FIG. 1, computing device 116 may include an optimal flight plan machine-learning model 156 to generate an optimized flight plan 160. Optimized flight plan 160 may include at least a desired flight plan. A "desired flight plan," for the purposes of this disclosure, is a flight plan optimized and/or prioritized on factors including flight time, flight safety, flight efficiency, and the like thereof. Persons skilled in the art, upon reviewing the entirety of this disclosure, will be aware of various flight factors for a flight plan consistent with the entirety of this disclosure. In a non-limiting embodiment, optimized flight plan 160 may include any optimized flight plan in the case the flight plan for the electric aircraft is not required to be filed to the ATC authority 148. For example, and without limitation an optimal flight plan machine-learning model 156 may utilize a linear regression machine-learning process, wherein the updated machine-learning model may incorporate a gradient boosting machine-learning process. Updated machine learning model may additionally or alternatively include any machine-learning model used as an updated machine learning model as described in U.S. Nonprovisional application Ser. No. 17/106,658, filed on Nov. 50, 2020, and entitled "A SYSTEM AND METHOD FOR GENERATING A DYNAMIC WEIGHTED COMBINATION," the entirety of which is incorporated herein by reference. An "optimized flight plan," for the purposes of this disclosure, is a designated route or a plurality of designated routes representing a safest flight plan, a shortest flight plan, a most efficient flight plan, and the like thereof. Optimized flight plan 160 may include a plurality of designated routes stacked on multiple altitude levels. Optimized flight plan 160 may differentiate a flight plan for different altitudes designated for different class or type of aircraft. Optimized flight plan may be transmitted to an ATC authority 148 for re-confirmation via a feedback loop.

With continued reference to FIG. 1, computing device 116 is configured to determine the optimized flight plan 160 as a function of at least a desired flight plan 144 and the optimal flight plan machine-learning model 156. An "optimal flight plan machine-learning model," for the purposes of this disclosure, is a machine-learning model configured to produce an optimized flight plan output given the at least a desired flight plan 144 as inputs, which is in contrast to a non-machine learning software program where the commands to be executed are determined in advance by a user and written in a programming language. The optimal flight plan machine-learning model 156 may include one or more optimal flight plan machine-learning processes. Computing device 116 may be configured to determine an optimized flight plan 160 by training an optimal flight plan machine-learning process as a function of an optimal flight plan training set. An "optimal flight plan training set," for the purposes of this disclosure, is a training set that correlates at least a desired flight plan 144 or any proposed flight plan that may be filed to an ATC authority 148 or retrieved from an aircraft requirement database 128 to an optimized flight plan 160. Optimal flight plan training set may be received as a function of a manual pilot input by the pilot of the aircraft or a remote pilot. Computing device 116 may receive the optimal flight plan training set by receiving correlations of a proposed flight plan or the at least a desired flight plan 144 that was previously received and/or determined during a previous iteration of determining optimized flight plan 160. In a non-limiting embodiment, at least a desired flight plan, an aircraft requirement, and/or separation element may relate to an optimized flight plan 160 of a specific aircraft class such as a drone, airliner, UAV, and the like thereof.

Still referring to FIG. 1, computing device 116 may receive optimal flight plan machine-learning model from a remote device that utilizes one or more machine learning processes. In a non-limiting embodiment, a remote device may include a computing device, external device, processor, and the like thereof. The remote device may perform the optimal flight plan machine-learning process using the optimal flight plan training set to determine the optimized flight plan 160 and transmit the output to the computing device 116 for further use such as generating an optimized flight plan 160. The remote device may transmit a signal, bit, datum, or parameter to computing device 116 that at least relates to aircraft requirement 124. Additionally or alternatively, the remote device may provide an updated machine-learning model. For example, and without limitation, an updated machine-learning model may be comprised of a firmware update, a software update, an optimal flight plan machine-learning process correction, and the like thereof. As a non-limiting example a software update may incorporate a new flight plan that relates to a modified desired flight plan, aircraft requirement, and/or separation requirement. Additionally or alternatively, the updated machine learning model may be transmitted to the remote device, wherein the remote device may replace the machine machine-learning model with the updated machine-learning model and determine the optimized flight plan as a function of the at least a desired flight plan 144, the aircraft requirement, and the separation requirement using the updated machine-learning model. The updated machine-learning model may be transmitted by the remote device and received by computing device 116 as a software update, firmware update, or corrected optimal flight plan machine-learning model. For example, and without limitation an optimal flight plan machine-learning model may utilize a linear regression machine-learning process, wherein the updated machine-learning model may incorporate a gradient boosting machine-learning process.

With continued reference to FIG. 1, computing device 116 may store the optimized flight plan 160 in the aircraft requirement database 128. In a non-limiting embodiment, the optimized flight plan that is stored in the aircraft requirement database 128 may later be used by the electric aircraft to fly the same or similar flight path in the future. For example and without limitation, a future flight consisting of the same arriving and departing information may be detected by the computing device 116 of the electric aircraft and retrieve the optimized flight plan 160 used previously for a flight associated with the same arriving and departing information. The retrieved flight plan may be still required to undergo another round of verification by an ATC authority 148 regarding new weather and congestion factors. In a non-limiting embodiment, optimized flight plan 160 may be constantly optimized as a function of new information and data being captured by the various subsystems of the electric aircraft during a flight of the electric aircraft. For example and without limitation, an electric aircraft that is small enough that does not require a flight plan to be filed or verified may configured the computing device 116 to optimize its current flight plan as it retrieves more information of the aircrafts surroundings. A person of ordinary skill in the art, after viewing the entirety of this disclosure, would appreciate the various adjustments a computing device may be required to make as a function of new information being received.

Referring now to FIG. 1, the optimized flight plan 160 may be generated using a loss function by a loss function module. A mathematical expression may represent a loss function where a "loss function" is an expression of an output of which an optimization algorithm minimizes to generate an optimal result. As a non-limiting example, loss function module may calculate variables of each of an air traffic datum and/or duration datum, calculate an output of optimized flight using the variables, and select at least a flight plan that produces an output having the lowest size, according to a given definition of "size," of the sets of outputs representing each of the plurality of optimized flight plans; size may, for instance, include absolute value, numerical size, or the like. Selection of different loss functions may result in identification of different prescriptive elements as generating minimal outputs. An "air traffic datum," for the purpose of this disclosure, is an element of data describing the traffic and congestion of a sector in the sky representing at least a highway. For example and without limitation, air traffic datum may include the density of aircraft flying through a sector. A "duration datum," for the purpose of this disclosure, is an element of data describing the duration of a flight of an electric aircraft. Loss function module may include any hardware and/or software module. Loss function module may be designed and configured to receive an aircraft requirement and/or at least a desired flight plan, minimize the loss function, select at least a desired flight plan or optimized flight plan as a function of minimizing the loss function and transmit the new flight plan to an augmented reality device.

With continued reference to FIG. 1, loss function module may generate loss function by evaluating at least an aur traffic datum and/or at least a duration datum. In generating a loss function, loss function module may assign a weighted variable to at least a flight plan as a function of the at least an air traffic datum and/or the at least a duration datum and minimizes the loss function as a function of the weighted variable. In a non-limiting embodiment, loss function module may classify at least a desired flight plan using at least a flight plan datum and/or at least an aircraft requirement. Classification may include data describing which category a particular desired flight plan belongs to. Categories may include optimal, average, and low. In an embodiment, flight plan datum and/or aircraft requirement that contain low scores indicating desired flight plans of little importance may be classified as low flight plan datum and aircraft requirement that contain high scores indicating at least a desired flight plan of high importance may be classified as optimal. Loss function module may generate classification labels as a function of classifying at least a desired flight plan. Loss function module may select at least a desired flight plan containing an "optimal" classification label and minimizes the total variance from the at least a desired flight plan containing an optimal classification label. For example and without limitation, the at least a desired flight plan with an optimal classification label may include a flight plan that may denote the shortest, fastest, safest, or combination thereof, flight plan.

With continued reference to FIG. 1, loss function module may generate a plurality of flight plan neutralizers. A "flight plan neutralizer" as used in this disclosure, includes at least a desired flight plan that contains a smaller weighted variable score intended to help minimize the at least a desired flight plan containing a larger weighted variable score. Loss function module may generate flight plan neutralizers by selecting the at least a desired flight plan that contain a low weighted variable score and/or are classified as containing a "low" and/or "average" classification labels. Loss function module may transmit the plurality of user implementation neutralizers to an augmented reality device. Loss function module may receive a flight plan neutralizer response from the augmented reality device. flight plan neutralizer response may contain a selection of a flight plan neutralizer from the plurality of flight plan neutralizers. Loss function module may select a flight plan neutralizer as a function of the flight plan neutralizer response and minimizes the loss function utilizing the selected flight plan neutralizer.

With continued reference to FIG. 1, computing device 116 may be configured to transmit the optimized flight plan 160 to an augmented reality device 164. The augmented reality device 164 may be configured to receive the optimized flight plan. An "augmented reality" device, as used in this disclosure, is a device that permits a pilot to view a typical field of vision of the pilot and superimposes virtual images on the field of vision. Augmented reality device 164 may include a graphical user interface (GUI). Augmented reality device 164 may include a view window which includes as a portion of the augmented reality device 164 that admits a view of field of vision. The view window may include a transparent window, such as a transparent portion of goggles such as lenses or the like. Augmented reality device 164 may include a projection device 168, defined as a device that inserts images into field of vision. Where view window is a screen, projection device 168 may include a software and/or hardware component that adds inserted images into a display signal to be rendered on a display. Projection device 168 may be configured to render images representing the optimized flight plan 160. Projection device 168 and/or view window may make use of reflective waveguides, diffractive waveguides, or the like to transmit, project, and/or display images. For instance, and without limitation, projection device 168 and/or display may project images through and/or reflect images off an eyeglass-like structure and/or lens piece, where either both field of vision and images from projection device 168 may be so displayed, or the former may be permitted to pass through a transparent surface. Projection device 168 and/or view window may be incorporated in a head mounted display for a pilot to wear. Projection device 168 may be incorporated into several windows including peripheral displays.

Figure 2:
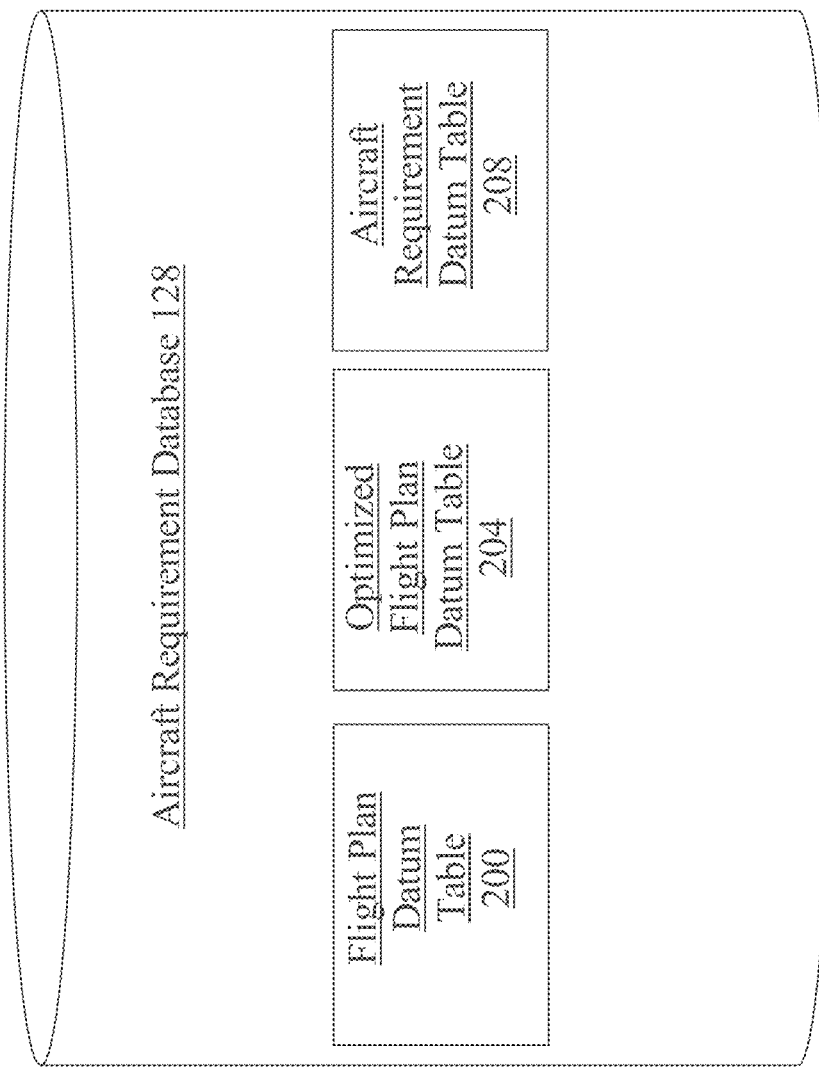
FIG. 2 is a block diagram illustrating an embodiment of an aircraft requirement database.

Referring now to FIG. 2, an embodiment of aircraft requirement database 128 is illustrated. Aircraft requirement database 128 may include any data structure for ordered storage and retrieval of data, which may be implemented as a hardware or software module. Aircraft requirement database 128 may be implemented, without limitation, as a relational database, a key-value retrieval datastore such as a NOSQL database, or any other format or structure for use as a datastore that a person skilled in the art would recognize as suitable upon review of the entirety of this disclosure. Aircraft requirement database 128 may include a plurality of data entries and/or records corresponding to elements as described above. Data entries and/or records may describe, without limitation, data concerning the plurality of flight plan datum, optimized flight plan datum, and aircraft requirement datum.

Still referring to FIG. 2, one or more database tables in aircraft requirement database 128 may include, as a non-limiting example, a flight plan datum table 200. Flight plan datum table 200 may be a table storing each flight plan datum of the plurality of flight plan datum generated by computing device 116. For instance, and without limitation, aircraft requirement database 128 may include flight plan datum table 200 listing each flight plan datum associated with the plurality of measured flight data. For example and without limitation, flight plan datum table 200 may list each flight plan and/or proposed flight plan that may be generated as a function of an aircraft requirement 124 and at least a flight plan datum 120.

Continuing to refer to FIG. 2, one or more database tables in aircraft requirement database 128 may include, as a non-limiting example, an optimized flight plan datum table 204. Optimized flight plan datum table 204 may be a table storing the optimized flight plan generated by an optimized flight plan machine-learning model. For instance, and without limitation, aircraft requirement database 128 may include an optimized flight plan datum table 204 listing the optimized flight plan such as a flight plan initially approved by an ATC authority or modified during the whole duration of the flight.

With continued reference to FIG. 2, one or more database tables in aircraft requirement database 128 may include, as a non-limiting example, an aircraft requirement datum table 208. Aircraft requirement datum table 208 may be a table storing aircraft requirement generated by the computing device 116. For instance, and without limitation, aircraft requirement database 128 may include an aircraft requirement datum table 208 listing a plurality of aircraft requirements associated with the flight plan datum. Tables presented above are presented for exemplary purposes only; persons skilled in the art will be aware of various ways in which data may be organized in aircraft requirement database 128 consistently with this disclosure.

Figure 3:
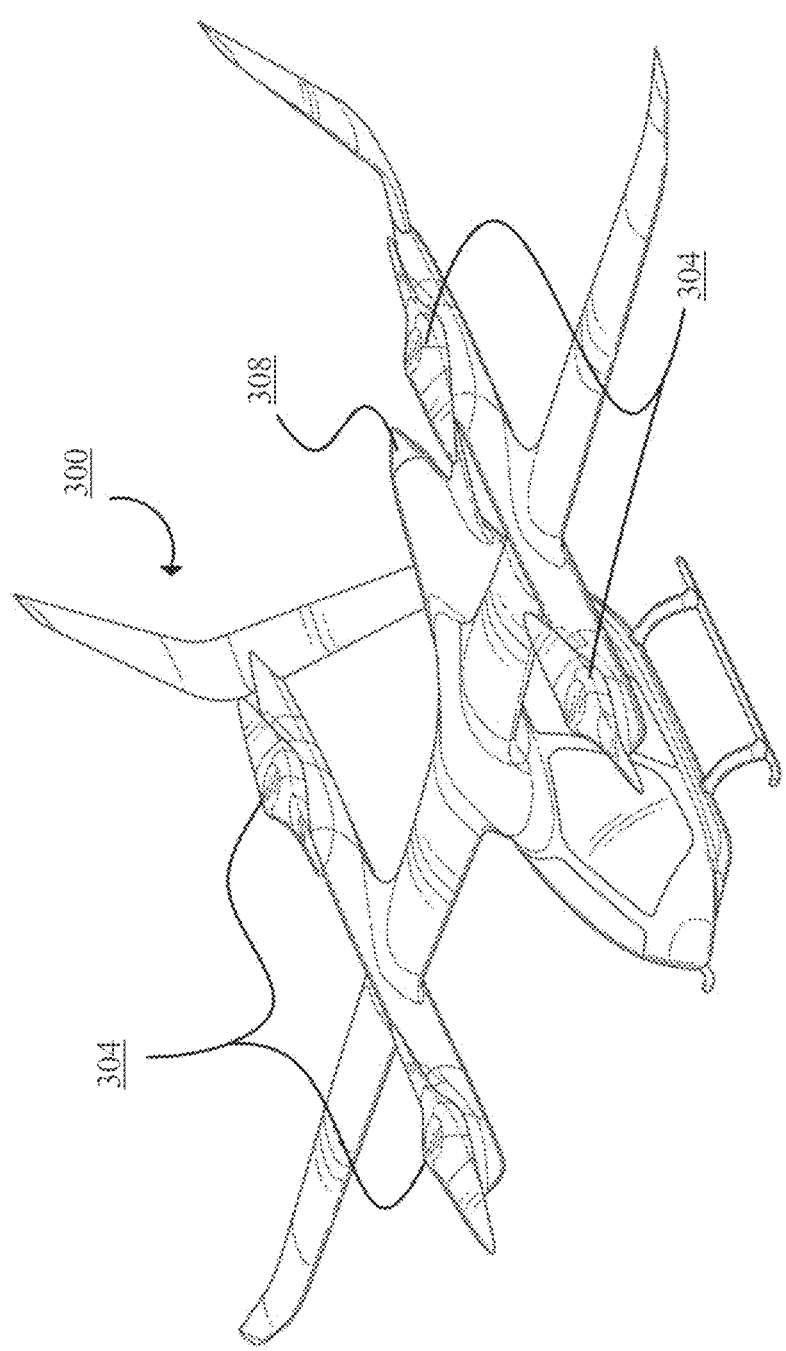
FIG. 3 is a diagrammatic representation of an exemplary embodiment of an electric aircraft.

Referring now to FIG. 3, an exemplary embodiment of an aircraft 300, which may include, or be incorporated with, a system for optimization of a recharging flight plan is illustrated. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like thereof.

Still referring to FIG. 3, aircraft 300 may include an electrically powered aircraft. In embodiments, electrically powered aircraft may be an electric vertical takeoff and landing (eVTOL) aircraft. Aircraft 300 may include an unmanned aerial vehicle and/or a drone. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, electric aircraft may be configured with an electric propulsion assembly. Electric propulsion assembly may include any electric propulsion assembly as described in U.S. Nonprovisional application Ser. No. 16/703,225, filed on Dec. 4, 2019, and entitled "AN INTEGRATED ELECTRIC PROPULSION ASSEMBLY," the entirety of which is incorporated herein by reference. For purposes of description herein, the terms "upper", "lower", "left", "rear", "right", "front", "vertical", "horizontal", "upward", "downward", "forward", "backward" and derivatives thereof shall relate to the invention as oriented in FIG. 3.

Still referring to FIG. 3, aircraft 300 includes a fuselage 304. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 304 may include structural elements that physically support a shape and structure of an aircraft. Structural elements may take a plurality of forms, alone or in combination with other types. Structural elements may vary depending on a construction type of aircraft such as without limitation a fuselage 304. Fuselage 304 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later herein.

In embodiments, and with continued reference to FIG. 3, aircraft fuselage 304 may include and/or be constructed using geodesic construction. Geodesic structural elements may include stringers wound about formers (which may be alternatively called station frames) in opposing spiral directions. A "stringer," as used in this disclosure, is a general structural element that includes a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 304 orthogonal to a longitudinal (nose to tail) axis of the aircraft and may form a general shape of fuselage 304. A former may include differing cross-sectional shapes at differing locations along fuselage 304, as the former is the structural element that informs the overall shape of a fuselage 304 curvature. In embodiments, aircraft skin may be anchored to formers and strings such that the outer mold line of a volume encapsulated by formers and stringers comprises the same shape as aircraft 300 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

In an embodiment, and still referring to FIG. 3, fuselage 304 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, and further referring to FIG. 3, fuselage 304 may include a semi-monocoque construction. Semi-monocoque construction, as used herein, is a partial monocoque construction, wherein a monocoque construction is describe above detail. In semi-monocoque construction, aircraft fuselage 304 may derive some structural support from stressed aircraft skin and some structural support from underlying frame structure made of structural elements. Formers or station frames can be seen running transverse to the long axis of fuselage 304 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of the aforementioned components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 3, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 3, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 304. Monocoque comprises only structural skin, and in that sense, aircraft skin undergoes stress by applied aerodynamic fluids imparted by the fluid. Stress as used in continuum mechanics may be described in pound-force per square inch (lbf/in$^2$) or Pascals (Pa). In semi-monocoque construction stressed skin may bear part of aerodynamic loads and additionally may impart force on an underlying structure of stringers and formers.

Still referring to FIG. 3, it should be noted that an illustrative embodiment is presented only, and this disclosure in no way limits the form or construction method of a system and method for loading payload into an eVTOL aircraft. In embodiments, fuselage 304 may be configurable based on the needs of the eVTOL per specific mission or objective. The general arrangement of components, structural elements, and hardware associated with storing and/or moving a payload may be added or removed from fuselage 304 as needed, whether it is stowed manually, automatedly, or removed by personnel altogether. Fuselage 304 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 304 may also be configurable to accept certain specific cargo containers, or a receptable that can, in turn, accept certain cargo containers.

Still referring to FIG. 3, aircraft 300 may include a plurality of laterally extending elements attached to fuselage 304. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 3, aircraft 300 includes a plurality of flight components 308. As used in this disclosure a "flight component" is a component that promotes flight and guidance of an aircraft. In an embodiment, flight component 308 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 3, plurality of flight components 308 may include at least a lift propulsor component 312. As used in this disclosure a "lift propulsor component" is a component and/or device used to propel a craft upward by exerting downward force on a fluid medium, which may include a gaseous medium such as air or a liquid medium such as water. Lift propulsor component 312 may include any device or component that consumes electrical power on demand to propel an electric aircraft in a direction or other vehicle while on ground or in-flight. For example, and without limitation, lift propulsor component 312 may include a rotor, propeller, paddle wheel and the like thereof, wherein a rotor is a component that produces torque along the longitudinal axis, and a propeller produces torquer along the vertical axis. In an embodiment, lift propulsor component 312 includes a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift propulsor component 312 may include a rotating power-driven hub, to which are attached several radial airfoil-section blades such that the whole assembly rotates about a longitudinal axis. Blades may be configured at an angle of attack, wherein an angle of attack is described in detail below. In an embodiment, and without limitation, angle of attack may include a fixed angle of attack. As used in this disclosure a "fixed angle of attack" is fixed angle between a chord line of a blade and relative wind. As used in this disclosure a "fixed angle" is an angle that is secured and/or unmovable from the attachment point. For example, and without limitation fixed angle of attack may be 3.2° as a function of a pitch angle of 9.7° and a relative wind angle 8.5°. In another embodiment, and without limitation, angle of attack may include a variable angle of attack. As used in this disclosure a "variable angle of attack" is a variable and/or moveable angle between a chord line of a blade and relative wind. As used in this disclosure a "variable angle" is an angle that is moveable from an attachment point. For example, and without limitation variable angle of attack may be a first angle of 6.7° as a function of a pitch angle of 7.1° and a relative wind angle 3.4°, wherein the angle adjusts and/or shifts to a second angle of 3.7° as a function of a pitch angle of 3.1° and a relative wind angle 3.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine a speed of forward movement as the blade rotates.

In an embodiment, and still referring to FIG. 3, lift propulsor component 312 may be configured to produce a lift. As used in this disclosure a "lift" is a perpendicular force to the oncoming flow direction of fluid surrounding the surface. For example, and without limitation relative air speed may be horizontal to aircraft 300, wherein lift force may be a force exerted in a vertical direction, directing aircraft 300 upwards. In an embodiment, and without limitation, lift propulsor component 312 may produce lift as a function of applying a torque to lift propulsor component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, one or more flight components such as a power sources may apply a torque on lift propulsor component 312 to produce lift. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. A power source may provide electrical energy to a stator for the generation of a magnetic field by the plurality of magnets. At least a power source may be driven by direct current (DC) electric power; for instance, at least a power source may include, without limitation, brushless DC electric motors, switched reluctance motors, or induction motors. At least a power source may include electronic speed controllers (not shown) or other components for regulating motor speed, rotation direction, and/or dynamic braking. At least power source may include or be connected to one or more sensors (not shown) detecting one or more conditions of at power source; one or more conditions may include, without limitation, voltage levels, electromotive force, current levels, temperature, current speed of rotation, and the like. One or more sensors may communicate a current status of at least power source to a person operating electric propulsion assembly or a computing device; computing device may include any computing device as described below in reference to FIG. 8, including without limitation a vehicle controller as set forth in further detail below. Persons skilled in the art, upon reviewing the entirety of this disclosure, will be aware of various devices and/or components that may be used as or included at least a power source or a circuit operating a at least a power source, as used and described herein. At least a power source may include at least a battery cell. At least a power source may be a high specific energy density energy source designed to deliver an amount of energy per mass for a period of time. Specific energy capacity is expressed in units of Wh/kg. Power sources may be designed as high energy density to supply a load for extended periods of time, repeatedly. High specific power density energy sources are designed to deliver a high amount of power in a specific period of time. Specific power density is expressed in units of W/kg. Power source may be designed as high-power density to be capable of delivering high amounts of power in shorter amounts of time repeatedly. In an embodiment, power source include both a high specific energy source and a high specific power source with technology such as a lithium-ion battery, the high specific power density energy source may have a higher voltage made available by connected the cells in series to increase the voltage than high specific energy density energy source. Some battery chemistries offer better energy density than power density and vice versa. Most lithium-ion chemistries offer both qualities and are arrange and/or used to supply either energy or power or both for a given application. The application and demand on the battery for a particular period of time will determine is that particular assembly is a high energy density energy source or a high-power density energy source. At least a power source may include, without limitation, a generator, a capacitor, a supercapacitor, a photovoltaic device, a fuel cell such as a hydrogen fuel cell, direct methanol fuel cell, and/or solid oxide fuel cell, or an electric energy storage device; electric energy storage device may include without limitation a capacitor, an inductor, and/or a battery.

Still referring to FIG. 3, power source may include an energy source. An energy source may include, for example, an electrical energy source a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An electrical energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 300 may be incorporated.

In an embodiment, and still referring to FIG. 3, an energy source may be used to provide a steady supply of electrical power to a load over the course of a flight by a vehicle or other electric aircraft. For example, an energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, an energy source may be capable of providing sufficient electrical power for auxiliary loads including without limitation, lighting, navigation, communications, de-icing, steering or other systems requiring power or energy. Further, an energy source may be capable of providing sufficient power for controlled descent and landing protocols, including, without limitation, hovering descent or runway landing. As used herein an energy source may have high power density where electrical power an energy source can usefully produce per unit of volume and/or mass is relatively high. "Electrical power," as used in this disclosure, is defined as a rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 3, an energy source may include a plurality of energy sources, referred to herein as a module of energy sources. A module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce an overall power output as a voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on measurement of at least an electrical parameter. In an embodiment where an energy source includes a plurality of battery cells, overall power output capacity may be dependent on electrical parameters of each individual cell. If one cell experiences high self-discharge during demand, power drawn from at least an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

In an embodiment and still referring to FIG. 3, plurality of flight components 308 may be arranged in a quad copter orientation. As used in this disclosure a "quad copter orientation" is at least a lift propulsor component oriented in a geometric shape and/or pattern, wherein each of the lift propulsor components are located along a vertex of the geometric shape. For example, and without limitation, a square quad copter orientation may have four lift propulsor components oriented in the geometric shape of a square, wherein each of the four lift propulsor components are located along the four vertices of the square shape. As a further non-limiting example, a hexagonal quad copter orientation may have six lift propulsor components oriented in the geometric shape of a hexagon, wherein each of the six lift propulsor components are located along the six vertices of the hexagon shape. In an embodiment, and without limitation, quad copter orientation may include a first set of lift propulsor components and a second set of lift propulsor components, wherein the first set of lift propulsor components and the second set of lift propulsor components may include two lift propulsor components each, wherein the first set of lift propulsor components and a second set of lift propulsor components are distinct from one another. For example, and without limitation, the first set of lift propulsor components may include two lift propulsor components that rotate in a clockwise direction, wherein the second set of lift propulsor components may include two lift propulsor components that rotate in a counterclockwise direction. In an embodiment, and without limitation, the first set of propulsor lift components may be oriented along a line oriented 65° from the longitudinal axis of aircraft 300. In another embodiment, and without limitation, the second set of propulsor lift components may be oriented along a line oriented 135° from the longitudinal axis, wherein the first set of lift propulsor components line and the second set of lift propulsor components are perpendicular to each other.

Still referring to FIG. 3, plurality of flight components 308 may include a pusher component 316. As used in this disclosure a "pusher component" is a component that pushes and/or thrusts an aircraft through a medium. As a non-limiting example, pusher component 316 may include a pusher propeller, a paddle wheel, a pusher motor, a pusher propulsor, and the like. Additionally, or alternatively, pusher flight component may include a plurality of pusher flight components. Pusher component 316 is configured to produce a forward thrust. As used in this disclosure a "forward thrust" is a thrust that forces aircraft through a medium in a horizontal direction, wherein a horizontal direction is a direction parallel to the longitudinal axis. As a non-limiting example, forward thrust may include a force of 1145 N to force aircraft to in a horizontal direction along the longitudinal axis. As a further non-limiting example, forward thrust may include a force of, as a non-limiting example, 300 N to force aircraft 300 in a horizontal direction along a longitudinal axis. As a further non-limiting example, pusher component 316 may twist and/or rotate to pull air behind it and, at the same time, push aircraft 300 forward with an equal amount of force. In an embodiment, and without limitation, the more air forced behind aircraft, the greater the thrust force with which the aircraft is pushed horizontally will be. In another embodiment, and without limitation, forward thrust may force aircraft 300 through the medium of relative air. Additionally or alternatively, plurality of flight components 308 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

In an embodiment and still referring to FIG. 3, aircraft 300 may include a flight controller located within fuselage 304, wherein a flight controller is described in detail below, in reference to FIG. 8. In an embodiment, and without limitation, flight controller may be configured to operate a fixed-wing flight capability. As used in this disclosure a "fixed-wing flight capability" is a method of flight wherein the plurality of laterally extending elements generate lift. For example, and without limitation, fixed-wing flight capability may generate lift as a function of an airspeed of aircraft 100 and one or more airfoil shapes of the laterally extending elements, wherein an airfoil is described above in detail. As a further non-limiting example, flight controller may operate the fixed-wing flight capability as a function of reducing applied torque on lift propulsor component 312. For example, and without limitation, flight controller may reduce a torque of 9 Nm applied to a first set of lift propulsor components to a torque of 3 Nm. As a further non-limiting example, flight controller may reduce a torque of 12 Nm applied to a first set of lift propulsor components to a torque of 0 Nm. In an embodiment, and without limitation, flight controller may produce fixed-wing flight capability as a function of increasing forward thrust exerted by pusher component 316. For example, and without limitation, flight controller may increase a forward thrust of 300 kN produced by pusher component 316 to a forward thrust of 369 kN. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift propulsor components present in aircraft 300.

In an embodiment, and still referring to FIG. 3, flight controller may be configured to perform a reverse thrust command. As used in this disclosure a "reverse thrust command" is a command to perform a thrust that forces a medium towards the relative air opposing aircraft 100. For example, reverse thrust command may include a thrust of 160 N directed towards the nose of aircraft to at least repel and/or oppose the relative air. Reverse thrust command may alternatively or additionally include any reverse thrust command as described in U.S. Nonprovisional application Ser. No. 17/319,155, filed on May 13, 2021, and entitled "AIRCRAFT HAVING REVERSE THRUST CAPABILITIES," the entirety of which is incorporated herein by reference. In another embodiment, flight controller may be configured to perform a regenerative drag operation. As used in this disclosure a "regenerative drag operation" is an operating condition of an aircraft, wherein the aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. Nonprovisional application Ser. No. 17/319,155.

In an embodiment, and still referring to FIG. 3, flight controller may be configured to perform a corrective action as a function of a failure event. As used in this disclosure a" corrective action" is an action conducted by the plurality of flight components to correct and/or alter a movement of an aircraft. For example, and without limitation, a corrective action may include an action to reduce a yaw torque generated by a failure event. Additionally or alternatively, corrective action may include any corrective action as described in U.S. Nonprovisional application Ser. No. 17/222,539, filed on Apr. 5, 2021, and entitled "AIRCRAFT FOR SELF-NEUTRALIZING FLIGHT," the entirety of which is incorporated herein by reference. As used in this disclosure a "failure event" is a failure of a lift propulsor component of the plurality of lift propulsor components. For example, and without limitation, a failure event may denote a rotation degradation of a rotor, a reduced torque of a rotor, and the like thereof. Additionally or alternatively, failure event may include any failure event as described in U.S. Nonprovisional application Ser. No. 17/113,647, filed on Dec. 7, 2020, and entitled "IN-FLIGHT STABILIZATION OF AN AIRCRAFT," the entirety of which is incorporated herein by reference.

Figure 4:
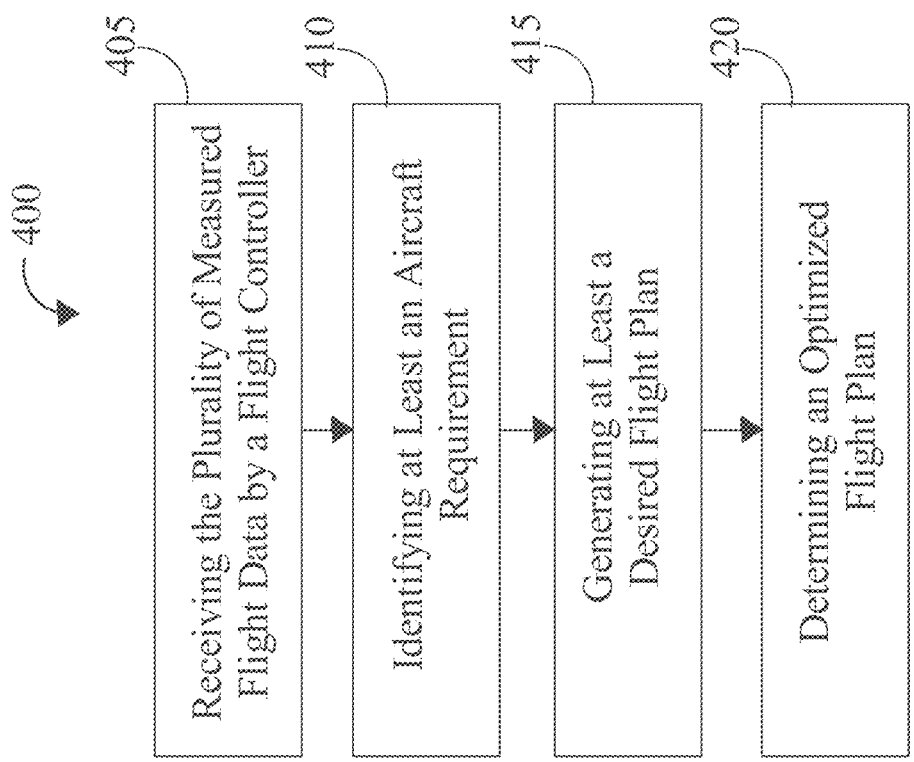
FIG. 4 is a process flow diagram illustrating an exemplary embodiment of a method of optimizing traffic control flight plan.

Now referring to FIG. 4, a process flow diagram illustrating an exemplary embodiment of a method 400 of optimizing traffic control flight plan is presented. Method 400, at step 405, is configured to receive a plurality of measured flight data from a remote device. plurality of measure flight data may include any measured flight data as described herein. Receiving the plurality of measured flight data may be performed utilizing a network methodology wherein the network methodology includes nay network methodology as described herein.

With continued reference to FIG. 4, method 400 incudes, at step 410, identifying at least an aircraft requirement. The at least an aircraft requirement includes any aircraft requirement as described herein. Identifying may include identifying as a function of the plurality of flight data. Step 410 may include using a flight plan datum that may be generated by a computing device. In a non-limiting embodiment, identifying the at least an aircraft requirement may include retrieving the at least an aircraft requirement from an aircraft requirement database.

With continued reference to FIG. 4, method 400 includes, at step 415, generating at least a desired flight plan. Desired flight plan may include any desired flight plan as described herein. desired flight plan may include an optimized flight plan as described in the entirety of this disclosure. In a non-limiting embodiment, generating the at least a desired flight plan may include generating the at least a desired flight plan as a function of an ATC authority and a separation requirement. In a non-limiting embodiment, generating the at least a desired flight plan may include generating a compromised flight plan as a function of a compromise between the electric aircraft and another aircraft or the electric aircraft and the ATC authority.

With continued reference to FIG. 4, method 400 includes, at step 420, determining an optimized flight plan. Optimized flight plan may include an optimized flight plan as described in the entirety of this disclosure. In a non-limiting embodiment, determining the optimized flight plan may include the use of an optimal flight plan machine-learning model. In a non-limiting embodiment, determining the optimized flight plan may include using a supervised machine-learning model. In a non-limiting embodiment, determining the optimized flight plan may include generating a loss function and minimizing the loss function.

Figure 5:
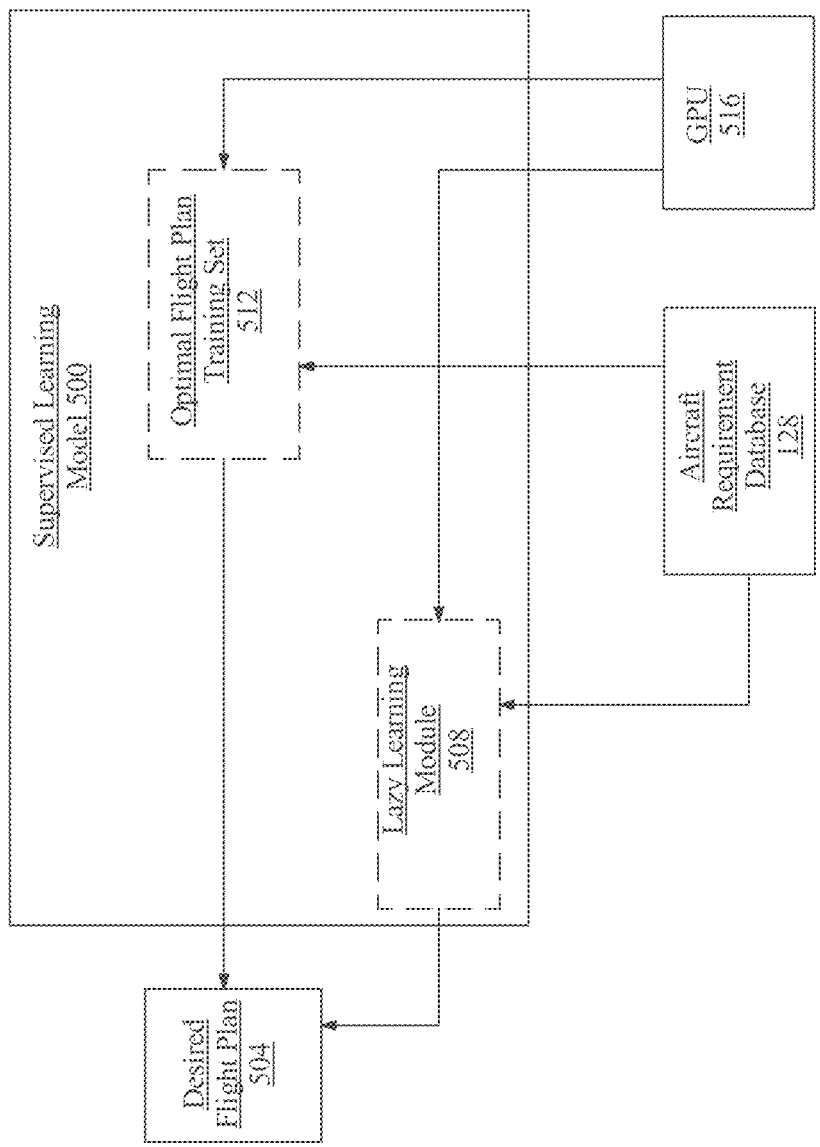
FIG. 5 is a block diagram illustrating an embodiment of a supervised machine-learning model.

Referring now to FIG. 5, an embodiment of supervised machine learning model 500 is illustrated. Supervised machine-learning model 500 is configured to generate a desired flight plan 504. In a non-limiting embodiment, desired flight plan 504 may include an optimized flight plan, wherein the optimized flight plan is described in the entirety of this disclosure. Desired flight plan 504 may be generated by selecting a training set as a function of the at least an aircraft requirement and the plurality of measured flight data, wherein the at least an aircraft requirement is correlated to an element of planning data. A "planning data," for the purpose of this disclosure, is any data describing flight information for a flight assigned to an electric aircraft. For example and without limitation, planning data may include time of departure, time of arrival, estimated time of flight, ground personnel, and the like thereof. Desired flight plan 504 is generated as a function of least an aircraft requirement, the plurality of measured flight data, and the selected training set. Supervised machine-learning model 500 generates the desired flight plan 504 using optimal flight plan training set 512. Supervised machine-learning model 500 may be configured to perform any supervised machine-learning algorithm as described above in reference to FIG. 1. This may include for example, support vector machines, linear regression, logistic regression, naïve Bayes, linear discriminant analysis, decision trees, k-nearest neighbor algorithm, neural networks, and similarity learning. In an embodiment, optimal flight plan training set 512 may include the at least a correlated dataset. Supervised machine-learning model 500 may be further configured to calculate the desired flight plan 504 as a function of relating the aircraft requirement to the flight plan associated with the desired flight plan 504.

Continuing to refer to FIG. 5, supervised machine-learning model 500 may generate desired flight plan 504 by executing a lazy learning module 508. Lazy learning module 508 is executed as a function of manufacturing request datum and the at least a part element. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" at a flight plan associated with an aircraft requirement and a planning data suing at least a training set such as an optimal flight plan training set 512. As a non-limiting example, an initial heuristic may include an initial calculation of a desired flight plan 504 and the arriving and departing statistics according to relation to an aircraft requirement and planning data.

With continued reference to FIG. 5, lazy learning module 508 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate external price outputs as described in this disclosure, including without limitation lazy learning applications of machine-learning algorithms as described in further detail below.

Figure 6:
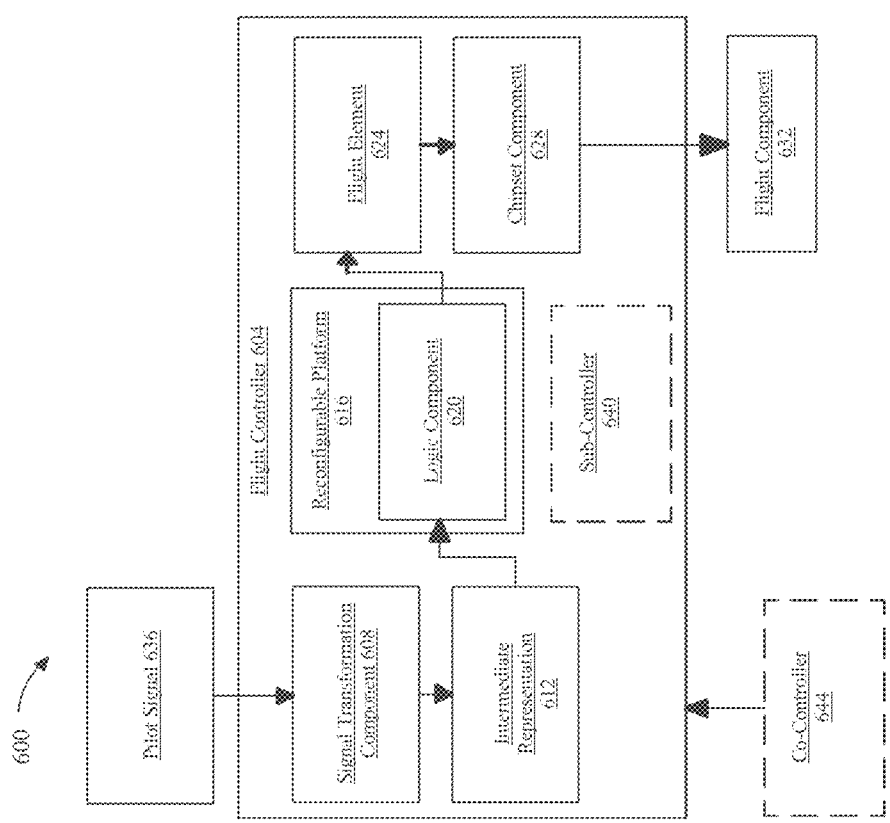
FIG. 6 is a block diagram of an exemplary embodiment of a flight controller.

Now referring to FIG. 6, an exemplary embodiment 600 of a flight controller 604 is illustrated. As used in this disclosure a "flight controller" is a computing device of a plurality of computing devices dedicated to data storage, security, distribution of traffic for load balancing, and flight instruction. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field/with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component. As used in this disclosure a "flight component" is a portion of an aircraft that can be moved or adjusted to affect one or more flight elements. For example, flight component may include a component used to affect the aircrafts' roll and pitch which may comprise one or more ailerons. As a further example, flight component may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller 604 may be configured generate an autonomous function. As used in this disclosure an "autonomous function" is a mode and/or function of flight controller 604 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 604 may generate autonomous function as a function of an autonomous machine-learning model. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller 604 to control and/or maintain a portion of aircraft, a portion of the flight plan, the entire aircraft, and/or the entire flight plan. As a further non-limiting example, pilot signal 636 may include an implicit signal, wherein flight controller 604 detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component. In an embodiment, control algorithm may be configured to create an optimized air signal communication as a function of segmentation boundary. For example, and without limitation, optimized air signal communication may include identifying the discrete timing required to transmit and/or receive the one or more segmentation boundaries. In an embodiment, and without limitation, creating optimized air signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$, that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$, applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, may be determined by training a neural network using training data, which may be performed using any suitable process as described above. In an embodiment, and without limitation, a neural network may receive semantic units as inputs and output vectors representing such semantic units according to weights $w_i$, that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above.

In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
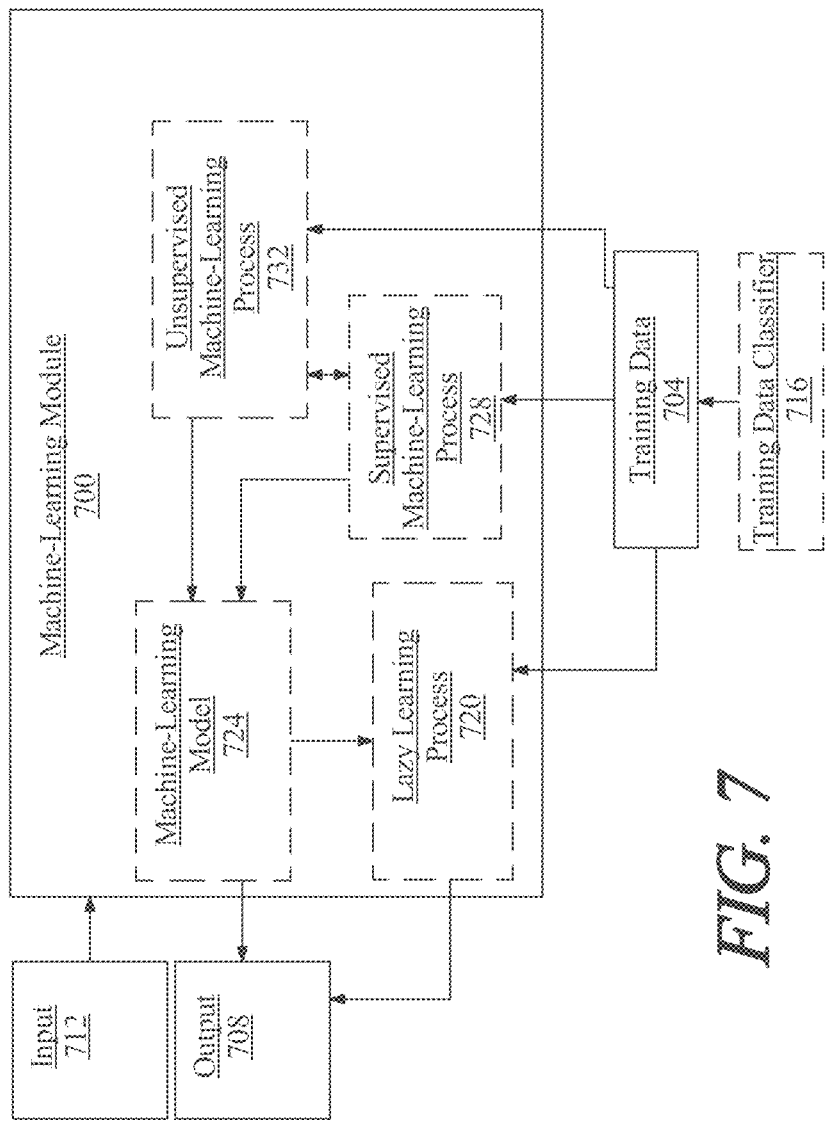
FIG. 7 is a block diagram of an exemplary embodiment of a machine-learning module.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language. Machine-learning module 700 may use inputs including a desired flight plan, an aircraft requirement, a flight plan datum, and/or a plurality of measured flight datum to output an optimized flight plan.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example a desired flight plan may be input used to put an optimized flight plan.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to a cohort of aircraft types/classes for which a subset of training data may be selected.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include at least a desired flight plan as an input and output an optimized flight plan, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 8:
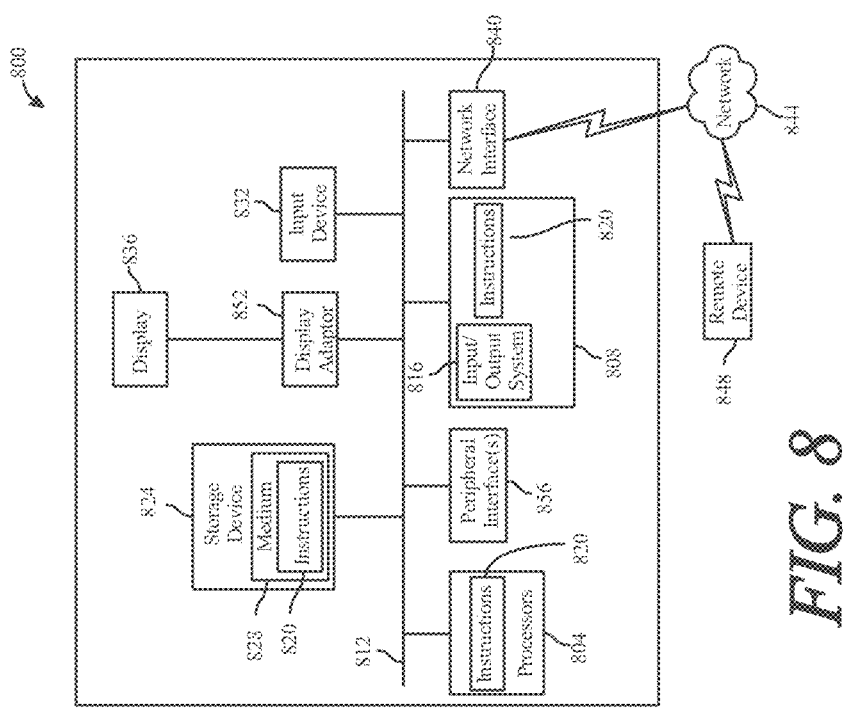
FIG. 8 is a block diagram of a computing system that can be used to implement any one or more of the methodologies disclosed herein and any one or more portions thereof.

Referring now to FIG. 8, an exemplary embodiment of a system 800 for optimizing traffic control flight plan is illustrated. System includes a flight controller which may include a computing device, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device may include a single computing device operating independently, or may include two or more computing device operating in concert, in parallel, sequentially or the like; two or more computing devices may be included together in a single computing device or in two or more computing devices. computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device, computing device ay include but is not limited to, for example, a computing device or cluster of computing devices in a first location and a second computing device or cluster of computing devices in a second location. computing device may include one or more computing devices dedicated to data storage, security, distribution of traffic for load balancing, and the like. computing device may distribute one or more computing tasks as described below across a plurality of computing devices of computing device, which may operate in parallel, in series, redundantly, or in any other manner used for distribution of tasks or memory between computing devices. computing device may be implemented using a "shared nothing" architecture in which data is cached at the worker, in an embodiment, this may enable scalability of system 100 and/or computing device.

With continued reference to FIG. 8, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system comprising:
a computing device, including a processor and a memory configured with instructions to:
receive a plurality of measured flight data, associated with an electric aircraft, from a remote device, wherein the plurality of measured flight data comprises a departure datum, wherein the departure datum comprises information on a remaining battery life status of a battery of the electric aircraft, and an arrival datum, and wherein the arrival datum comprises information on charging infrastructure at a landing location;
identify an aircraft requirement as a function of the plurality of measured flight data the aircraft requirement comprising an aircraft limit and an aircraft class;
generate a desired flight plan as a function of at least the departure datum, the arrival datum and the aircraft requirement; and
generate an optimized flight plan as a function of the desired flight plan, wherein generating the optimized flight plan comprises:
determining a required energy of the desired flight plan including a cruising flight phase that is a low energy flight phase; and
determining the optimized flight plan as a function of the required energy by executing a machine learning module that takes the remaining battery life status, the aircraft limit, a first altitude, and a second altitude as inputs, the machine learning module being trained using a plurality of records, each respective record of the plurality of records comprising a proposed flight plan and a manually adjusted flight plan generated by making manual adjustments to the proposed flight plan.

2. The system of claim 1, wherein determining the optimized flight plan includes:
generating a loss function based on an air traffic datum; and
minimizing the loss function.

3. The system of claim 2, wherein determining the optimized flight plan comprises:
training a machine-learning process with a training set, wherein the training set is retrieved from a database containing previous desired flight plan data correlated with previous optimized flight plan data.

4. The system of claim 1, wherein determining the optimized flight plan includes:
continuously updating the optimized flight plan based on real time information captured in measured flight data during a flight of the electric aircraft.

5. The system of claim 1, wherein generating the optimized flight plan includes determining a higher-power flight phase.

6. The system of claim 5, wherein generating the optimized flight plan includes determining the higher-power flight phase as a climb flight phase.

7. The system of claim 1, wherein generating the optimized flight plan includes selecting the first altitude or the second altitude.

8. A method comprising:
receiving, at a computing device, a plurality of measured flight data, associated with an electric aircraft, from a remote device, wherein the plurality of measured flight data comprises a departure datum, wherein the departure datum comprises information on a remaining battery life status of a battery of the electric aircraft, and an arrival datum, and wherein the arrival datum comprises information on charging infrastructure at a landing location;
identifying, at the computing device, an aircraft requirement as a function of the plurality of measured flight data, the aircraft requirement comprising an aircraft limit and an aircraft class;
generating, at the computing device, a desired flight plan as a function of at least the departure datum, the arrival datum and the aircraft requirement; and
generating, at the computing device, an optimized flight plan as a function of the desired flight plan, wherein generating the optimized flight plan comprises:
determining a required energy of the desired flight plan including a cruising flight phase that is a low energy flight phase; and
determining the optimized flight plan as a function of the required energy by executing a machine learning module that takes the remaining battery life status, the aircraft limit, a first altitude, and a second altitude as inputs, the machine learning module being trained using a plurality of records, each respective record of the plurality of records comprising a proposed flight plan and a manually adjusted flight plan generated by making manual adjustments to the proposed flight plan.

9. The method of claim 8, wherein determining the optimized flight plan includes:
generating a loss function based on an air traffic datum; and
minimizing the loss function.

10. The method of claim 9, wherein determining the optimized flight plan comprises:
training a machine-learning process with a training set, wherein the training set is retrieved from a database containing previous desired flight plan data correlated with previous optimized flight plan data.

11. The method of claim 10, wherein determining the optimized flight plan includes:
continuously updating the optimized flight plan based on real time information captured in measured flight data during a flight of the electric aircraft.

12. The method of claim 8, wherein generating the optimized flight plan includes determining a higher-power flight phase.

13. The method of claim 12, wherein generating the optimized flight plan includes determining the higher-power flight phase as a climb flight phase.

14. The method of claim 8, wherein generating the optimized flight plan includes selecting the first altitude or the second altitude based on the aircraft limit and the aircraft class.

15. A non-transitory computer readable medium configured with instructions that, when executed on a processor, are operable to:
receive a plurality of measured flight data, associated with an electric aircraft, from a remote device, wherein the plurality of measured flight data comprises a departure datum, wherein the departure datum comprises information on a remaining battery life status of a battery of the electric aircraft, and an arrival datum, and wherein the arrival datum comprises information on charging infrastructure at a landing location;

identify an aircraft requirement as a function of the plurality of measured flight data the aircraft requirement comprising an aircraft limit and an aircraft class;

generate a desired flight plan as a function of at least the departure datum, the arrival datum and the aircraft requirement; and generate an optimized flight plan as a function of the desired flight plan, wherein generating the optimized flight plan comprises:

determining a required energy of the desired flight plan including a cruising flight phase that is a low energy flight phase; and determining the optimized flight plan as a function of the required energy by executing a machine learning module that takes the remaining battery life status, the aircraft limit, a first altitude, and a second altitude as inputs, the machine learning module being trained using a plurality of records, each respective record of the plurality of records comprising a proposed flight plan and a manually adjusted flight plan generated by making manual adjustments to the proposed flight plan.

16. The non-transitory computer readable medium of claim 15, further configured with instructions to:

continuously update the optimized flight plan based on real time information captured in measured flight data during a flight of the electric aircraft.

17. The non-transitory computer readable medium of claim 15, wherein determining the optimized flight plan includes:

continuously updating the optimized flight plan based on real time information captured in measured flight data during a flight of the electric aircraft.

18. The non-transitory computer readable medium of claim 15, wherein the optimized flight plan includes a plurality of flight phases including a cruising flight phase and at least one higher-power phase including at least one of a descending flight phase, or a landing flight phase.

* * * * *